United States Patent [19]

Snader

[11] 4,140,080
[45] Feb. 20, 1979

[54] PORTABLE COMBINED ANIMAL CARRYING CAGE AND EXERCISING PEN

[76] Inventor: Howard T. Snader, 1807 E. Polk Ave., Victoria, Tex. 77901

[21] Appl. No.: 790,070

[22] Filed: Apr. 22, 1977

[51] Int. Cl.² ............................................. A01K 1/02
[52] U.S. Cl. ...................................................... 119/17
[58] Field of Search ............... 119/17, 19, 18; 43/105, 43/56, 60, 61; 220/8

[56] References Cited

U.S. PATENT DOCUMENTS

| | | | |
|---|---|---|---|
| 1,486,390 | 3/1924 | Pedersen | 43/105 |
| 1,759,770 | 5/1930 | Whetstone | 119/22 |
| 3,797,460 | 3/1974 | Blankenship | 119/17 |

Primary Examiner—Hugh R. Chamblee

[57] ABSTRACT

A portable combined animal cage and exercising device is composed of open work material, such as wire mesh or the like, to provide ample ventilation at all times.

The device is formed of a plurality of telescopic sections or units, preferably three or more, which may be telescoped to facilitate carrying or may be expanded to allow ample space for exercising or other purposes. One or more of the sections or units, preferably the end sections, may be provided with doors or the like, each having fastening means.

The sections are separable, and one at least of the end sections may be separately used as a cage.

Each section, or unit may be provided with readily removable doors or closures having releasable fastening means whereby each of the sections may be separately used as a portable cage.

9 Claims, 10 Drawing Figures

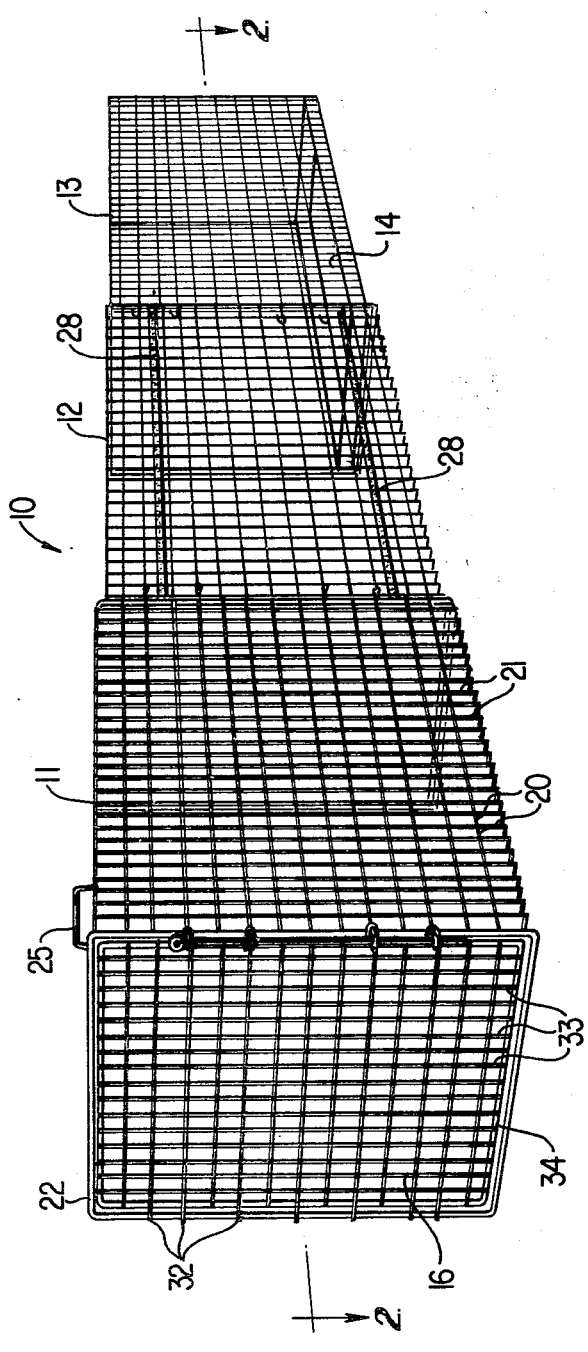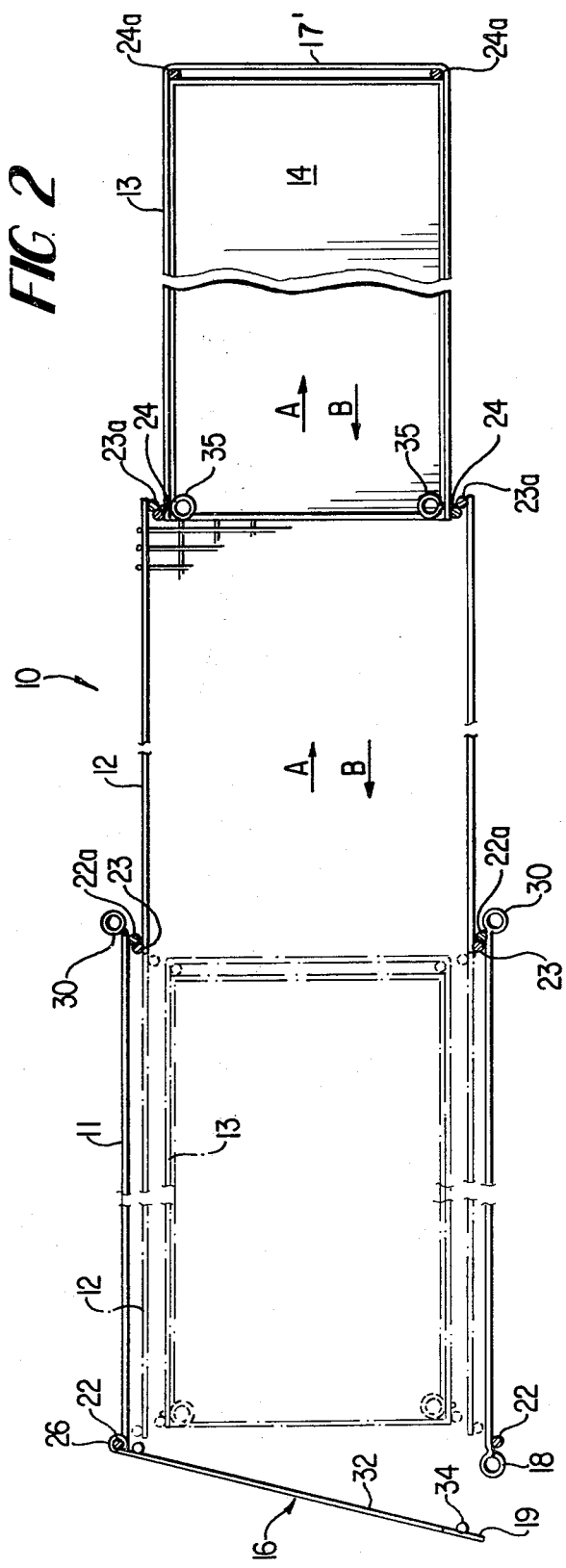

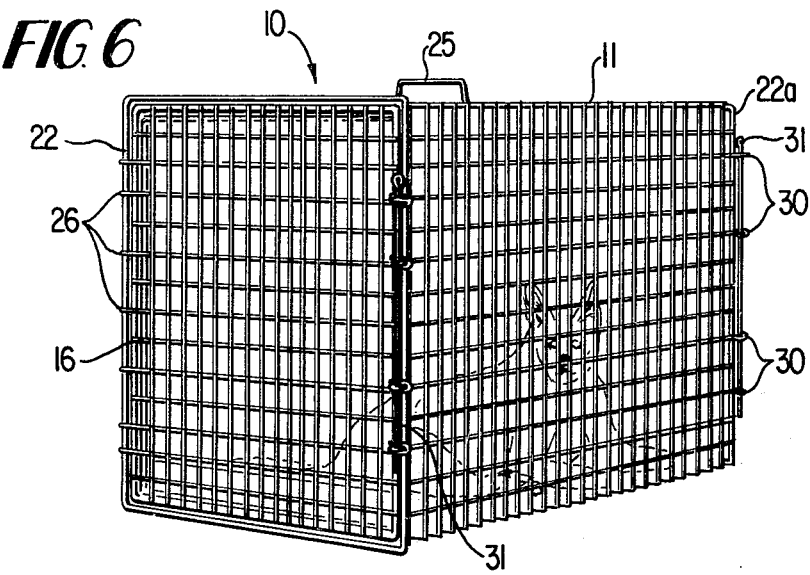
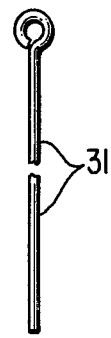
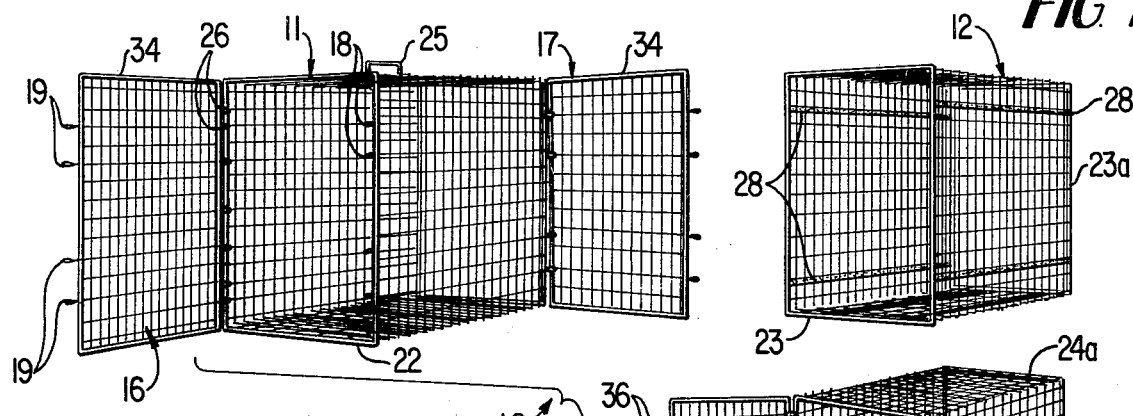
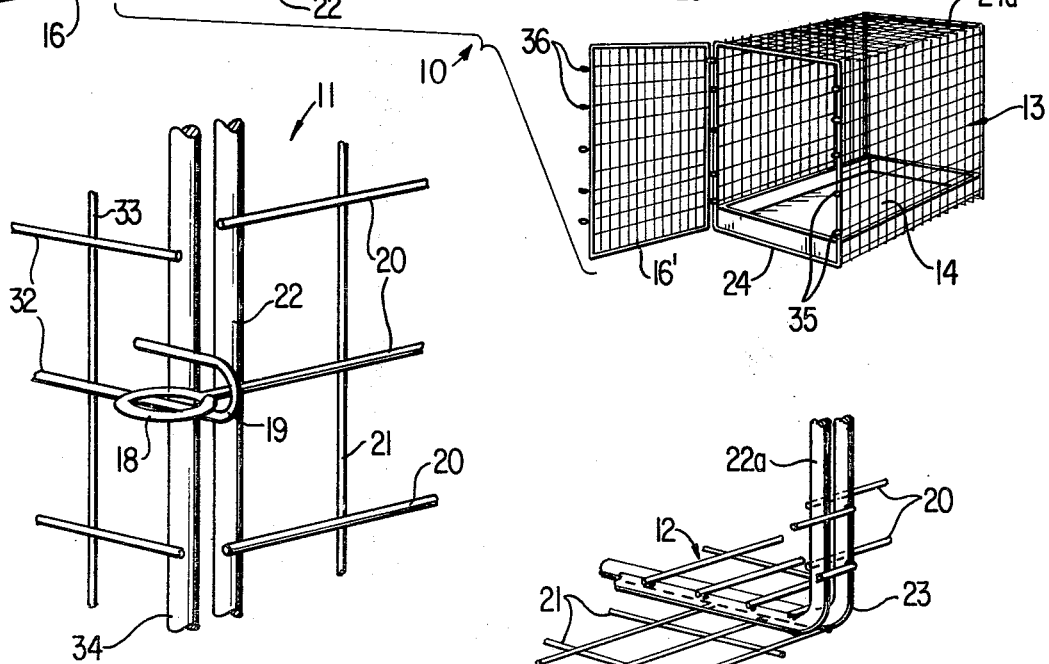
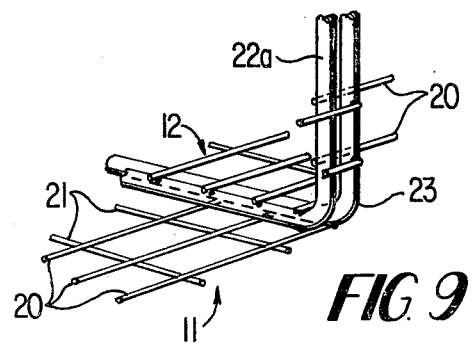

PORTABLE COMBINED ANIMAL CARRYING CAGE AND EXERCISING PEN

FIELD OF INVENTION

The invention relates to a portable combined animal cage and exercising device and more particularly to a portable cage which comprises a plurality of telescopic units which may be telescoped to provide a transportable animal cage and which may be expanded to provide an animal exercising pen. One or more of the units may be separated from the other units and used separately as a portable animal cage.

PRIOR ART AND BACKGROUND OF THE INVENTION

Expansible chicken coops including one section composed of sheet metal and another of open work material are known as shown, for example, in Speicher U.S. Pat. Nos. 1,303,736 and 1,345,968. The parts are not readily separable as in the present device, and the sheet metal portion does not provide proper ventilation even when supplied with ventilating openings and the construction is more expensive than in my device, the units of which are preferably composed principally of open mesh material.

Also collapsible animal cages are known formed of rectilinear welded wire fabric or the like as shown in Martin U.S. Pat. No. 3,896,766. Such cage is not composed of telescopic units and is not expansible as is applicant's device.

SUMMARY OF THE INVENTION

The invention relates to an expansible pen or animal cage or device preferably composed of open work material, such as wire mesh, composed of a plurality of telescopic portions, sections or units which, in telescoped position, occupy a minimum of space so that the device is adapted for use as a carrying cage, but which may be expanded to provide space for the animal to move about freely for exercising purposes. In either the telescoped or expanded positions, the open work material of which the telescopic components of the device are composed, ensure ample ventilation. Doors may be provided at either or both ends of the device, to allow the animal to enter or to be removed from the cage. Suitable means may be provided for releasably securing the doors in closed position. Also a suitable carrying handle may be provided.

The individual units or sections are provided with rectangular end frames, preferably of rods circular in cross section, to which frames of wire mesh may be suitably secured, as by spot welding, and doors or closures are preferably swingingly connected to the frames by loops, rings, hooks or the like and are readily secured in closed position by suitable fastening means, preferably hooks or the like. Additional doors may be detachably secured to the rectangular frames at the open ends of some of the units by means of detachable pins inserted in rings or loops carried by the end frames.

The individual units or sections are of progressively smaller cross sectional areas from the main or housing unit to the opposite end unit to permit them to be either telescoped within the main unit or to be expanded by moving successively smaller units in one direction away from the main or housing unit. In such expanded position, the units are prevented from separation by interengagement of their end frames, as will be more fully set forth hereinafter. On the other hand, the units may be completely separated from one another by moving them in the opposite direction as will also be more fully set forth.

The rectangular front and rear end frames of each individual unit are of different sizes, the front end frame being of larger cross sectional area than the rear end frame. The wire mesh covering the top, bottom and opposite sides of each unit is preferably secured by longitudinally extending wires of the wire mesh to the inside of the front end frame and to the outside of the rear end frame. The rear end frame of the largest unit is slightly larger in cross sectional area than the front end frame of the next smaller unit, however, the two frames overlap so that the smaller will not pass through the larger, thus the frames coact to prevent separation of the units in the expanding direction of the cage. Similarly the rear end frame of the intermediate unit is slightly larger in cross sectional area than the front end frame of the smallest unit. The front end frame of each unit is large enough to permit the next smaller unit to slide therethrough in order to facilitate separation of the units in the direction opposite to the expanding direction of the cage.

In order to better facilitate the sliding motion of the units relative to each other, at least the intermediate unit of a three unit telescopic cage, is provided with flat bars secured longitudinally along the outside of the sides and bottom of the unit. The flat bars present a smooth outer bearing surface to the adjacent unit in which the intermediate unit telescopes.

The invention will be more readily understood by reference to the accompanying drawings and the following detailed description of a preferred embodiment of the invention, which is set forth by way of illustration and not by way of limitation.

BRIEF DESCRIPTION OF THE DRAWINGS

FIG. 1 is a perspective view of the combined portable carrying cage and exercising pen, the device being shown in expanded position for use as an exercising pen.

FIG. 2 is a diagrammatic section on line 2—2 of FIG. 1, with some portions omitted, the device being shown in expanded position in full lines and being shown in phantom lines with the parts in telescoped or carrying position.

FIG. 6 is a perspective view showing the left hand or housing unit of FIG. 1 separated from the other units and used as a separate portable cage.

FIG. 7 is an exploded and somewhat diagrammatic view of the units of which the composite device is composed, showing the units separated as in FIG. 5, but showing the construction in greater detail than in FIG. 5. FIG. 8 is a fragmentary detail view showing a portion of the door fastening means of the front or housing unit also shown in FIGS. 6 and 7. The same or similar fastening means may be used in connection with the rear unit of FIG. 7, and if desired, may be also used in connection with the intermediate unit.

FIG. 9 is a detail fragmentary view of the interengaging frame means of adjacent units of the device also shown in the assembly of FIG. 2 and in FIG. 3.

FIG. 10 is an elevational view of a hinge pin used to detachably connect the removable doors of selected individual separable units of the invention.

DETAILED DESCRIPTION OF THE PREFERRED EMBODIMENT

Figure 3:
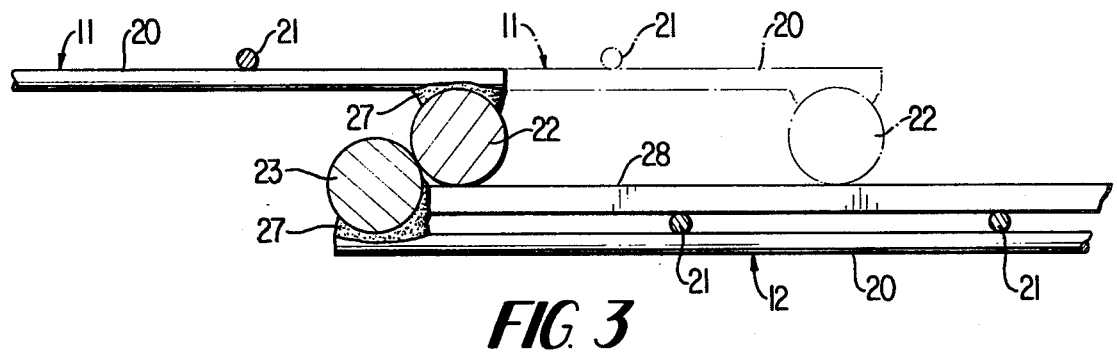
FIG. 3 is a detail view on an enlarged scale, of the connecting portions of adjacent units shown in smaller scale in FIG. 2.

Referring to the drawings, my improved portable combined animal cage and exercising pen is shown in extended position in FIGS. 1 and 2, and the entire assembly, or device, is indicated by the reference numeral 10. This same numeral is used throughout the drawings to indicate the combined units whether shown in expanded or collapsed position or in the completely separated position indicated in FIG. 5.

Referring to the assembly from left to right in FIG. 1, the device comprises three telescopic sections 11, 12 and 13. These sections are shown in the same order in FIG. 2 and in the reverse order in FIG. 5, and are shown in telescoped position in FIG. 4, and are indicated in phantom in FIG. 2.

The entire device 10 is composed principally of wire mesh construction so that adequate ventilation is ensured at all times. If desired a blanket or the like (not shown) may be provided to afford temporary protection. This may be provided for the entire device or may be provided for a portion only, preferably section 11, leaving the other sections open to ensure ventilation.

A removable member 14, which may be of plastic, metal or other suitable material, may be provided in section or unit 13 which also provides a floor for the carrying cage when the sections are telescoped. Member 14 may be a removable steel pan.

The telescopic sections or units 11, 12 and 13 are preferably rectangular in longitudinal and in transverse vertical cross sections as this has been found the most efficient and least expensive form, but other shapes may be employed without departure from the spirit of the invention in its broadest aspects. A total of three units have been disclosed and is preferred, but two or more units may be employed within the scope of my invention.

Since the sections or units 11, 12 and 13 are similar in construction, except for size and the end construction, a description of one will apply largely to the others.

As shown each section or unit comprises rectangular, open mesh side walls and open mesh top and bottom walls. The units 11, 12 and 13 are progressively smaller in cross section, from left to right, from what will be termed the main unit 11, which is adapted to serve as a housing for the other two when the units are telescoped, to the smallest or outer end unit 13, as best illustrated in FIGS. 1, 2, 5 and 7.

Figure 4:
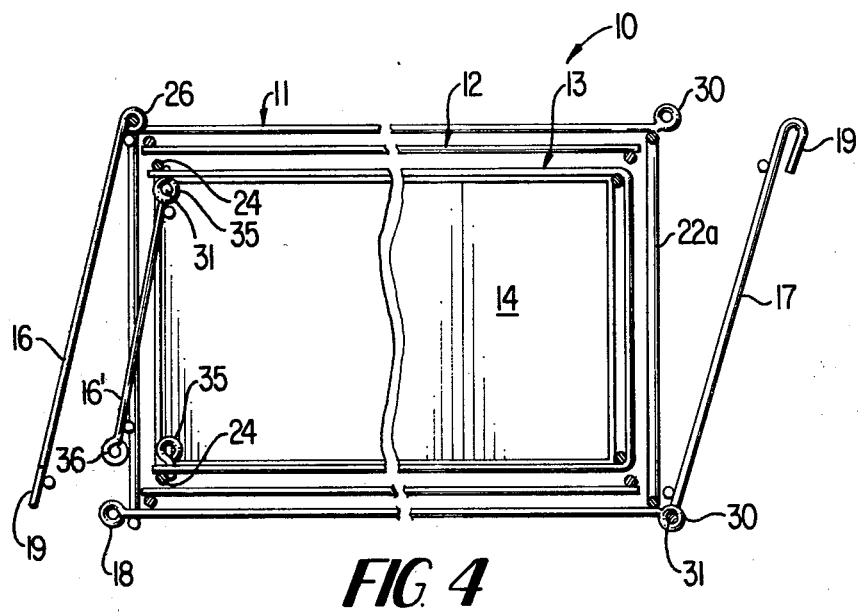
FIG. 4 is a top view, with portions of the wire netting omitted, showing the device in telescoped or collapsed position and showing the various swinging doors or closures with which the device is equipped.
Figure 5:
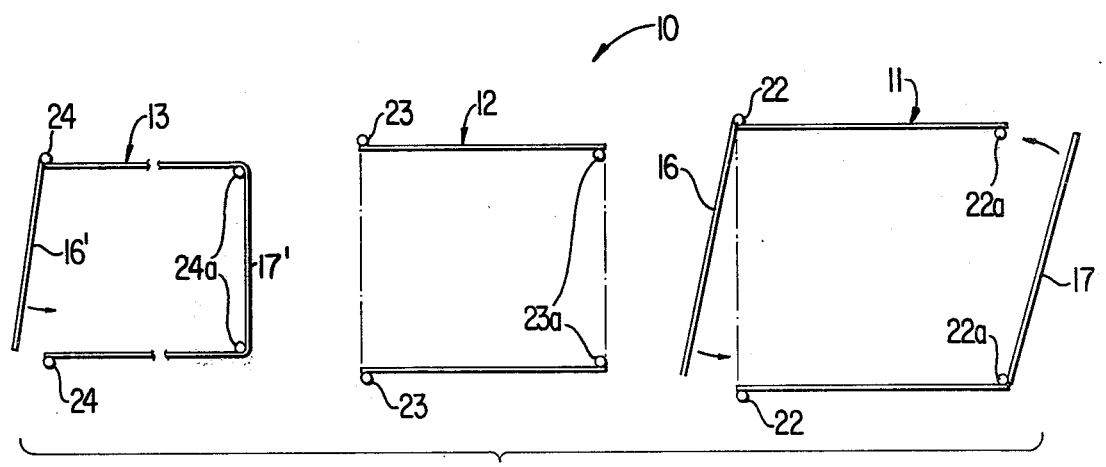
FIG. 5 is a somewhat diagrammatic exploded view showing the three units of the device separated and showing removable doors in the two end sections or units whereby each end section or unit may be used, if desired, as an independent or separate cage, the units being shown in reverse order to that shown in FIGS. 1, 2 and 7.

As best shown in FIGS. 4, 5 and 7 and drawings 1 and 2, housing section 11 may be provided with front and rear swinging doors 16 and 17, also of rectangular mesh construction, and each door may be provided with suitable releasable fastening means including loops 18 and hooks 19 (FIG. 8), whereby the unit or section 11 may be opened as indicated in FIG. 7 or closed as indicated in FIG. 6. The rear door 17 is readily removable and is secured by means of a loop and pin connection so that the units 12 and 13 may be telescoped within the housing unit 11. If desired, the door 16 may be made removable by similar connections for ease of assembly, as will be more fully illustrated hereinafter.

The intermediate or second unit 12 does not require doors unless it is intended to be used as a separate cage in which event front and rear removable swinging doors may be provided similar to the door 17 of unit 11 (FIG. 7).

The rear or smallest unit 13 is provided with an end door 17' which need not, but may be, removable and may also be provided with a removable front door 16', provided with suitable fastening means which may be similar to the fastening means 18, 19 of the door 16 of unit 11 (FIG. 8), so that the unit may be used as a separate cage when separated from the assembly as shown at the right in FIG. 7. If used, door 16' must be removed to permit unit 13 to function as a part of the expansible assembly shown in FIG. 1 wherein the expanded device serves as a runway or exercising pen. Preferably the side walls, top and bottom walls and doors of all the units 11, 12 and 13 are of open work construction. The wire mesh covering the top, bottom and opposite sides of the units 11, 12 and 13 is composed of a series of longitudinal wires 20, and transverse wires 21 intersecting each other at right angles, as shown in the various figures and as shown in detail in FIGS. 8 and 9. The wire mesh covering each of the doors 16, 16', 17 and 17' comprises generally horizontal wires 32 and upright wires 33 intersecting each other at right angles and welded to a rectangular door frame 34 (FIG. 1). The wires may be of steel coated with zinc and may be spot welded to each other and to suitable end frames, referred to hereinafter.

The open mesh side, top and bottom walls of each unit 11, 12 and 13 are connected to rectangular front and rear frames with which each of the units are provided. These rectangular frames are shown in FIGS. 1, 6 and 7, and the coacting relation of the frames of adjacent units is best illustrated in FIGS. 2 and 9.

Referring first to unit 11, a rectangular frame 22 is provided at the front end of the unit and a slightly smaller rectangular frame 22a is provided at the rear of the unit (see FIG. 2). The front ends of the open mesh, side, top and bottom wires of the unit 11 are secured to the inner sides of the rectangular frame 22, and the rear ends of said wall are secured to the outer sides of the rectangular rear frame 22a as best shown in FIGS. 2 and 5. The end frames 22 and 22a are preferably formed of small diameter zinc coated steel rods (FIGS. 2 and 3) bent to form a rectangle to which the longitudinally extending wires 20 are secured as by welding, indicated at 27 in FIG. 3.

Similarly the intermediate unit 12 is provided with front and rear frames 23 and 23a to which the open mesh side, top and bottom wires are secured as by welding as previously described in connection with the housing unit 11.

Also the rear end unit 13, which is of less cross sectional area than the unit 12, is provided with front and rear end frames 24 and 24a to which the open mesh side, top and bottom wires are secured as previously described in connection with units 11 and 12.

As will be apparent from FIG. 2, the rectangular front frame of each unit is of greater cross sectional area than the rear frame of each respective unit, and the front frame of each unit 12 and 13 is of cross sectional area greater than the rear frame of the adjacent units. As will be further apparent from FIGS. 2 and 3, units 11, 12 and 13 may be expanded to provide an exercising pen, and will be prevented from separation by the interengagement of the front frame 24 of the rear unit 13 with the rear frame 23a of the intermediate unit. Similarly the units 11 and 12 are prevented from separation in the direction of the arrow A by interengagement of the rear frame 22a of the unit 11 with the front frame 23 of the intermediate unit 12.

When it is desired to transport the combined units 10, the intermediate unit 12 and the rear unit 13 may be both telescoped within the housing unit 11 by moving the units 12 and 13 to the left in the direction of the arrow B to the fully telescoped carrying position, shown in phantom in FIG. 2 and in FIG. 4, and the door 16 of the unit 11 will then be latched to prevent escape of the animal from the cage. A carrying handle 25 shown in FIGS. 1 and 6 may be provided for the housing unit 11. The door 16 may be latched when the animal is enclosed.

The individual units may be completely separated by opening the door 16 of the unit 11 and moving the units 12 and 13 to the positions shown in FIGS. 5 and 7.

Inorder to facilitate smooth sliding of the cage units 11, 12 and 13 relative to each other, at least the intermediate unit 12 is provided with a plurality of flat slide bearings 28 which are mounted longitudinally along the outside of the wire mesh forming the sides and bottom of the unit as best seen in FIGS. 3 and 7. The slide bearings 28 are made of metal bar stock of rectangular cross section and are secured to the end frames 23 and 23a by welds as illustrated in FIG. 3 where only the weld attachment to end frame 23 is shown. The slide bearings 28 may also be attached to the outside of the rear end cage unit 13 in a similar manner if desired.

The operation of the device will be largely apparent from the foregoing description. The units may be readily expanded to the exercising position shown in FIG. 1 and in such expanded position, the front end of unit 11 and the rear end of unit 13 will be closed to prevent escape of the animal or animals enclosed therein. The units may also be telescoped to the carrying position shown in phantom in FIG. 2 and also indicated in FIG. 4, in which collapsed position the device serves as a cage which may be carried by means of the handle 25 with which the housing unit 11 is provided. The units 11, 12 and 13 may be completely separated from each other for shipping or other purposes.

When separated, the front and rear units, 11 and 13, may be used as individual cages being provided with front and rear doors as illustrated in FIGS. 5 and 7. The rectangular front and rear frames 22 and 22a, 23 and 23a, and 24 and 24a with which the respective units are supplied provide easy means for attachment and detachment of swinging doors or closures.

As indicated, for example, in FIG. 4, the door 16 is provided with one or more rings or hooks 26, only one of which is shown in this figure, by means of which the door is swingingly attached to the frame 22. The door may be detachably secured by the previously described latch means 18 and 19 shown in FIG. 8 or by other suitable means.

As previously set forth, the rear end of the front housing unit 11 is normally open as is the front end of the rear unit 13, and both ends of the intermediate unit may also be open.

Swinging doors which may be similar to the door 16 but of smaller cross-sectional area may be provided if it is desired to use the individual units as separate cages, independent of the other units. By the use of steel pins 31 and loops or hooks, the open ends of the various units may be provided with readily removable and latchable swinging doors. One such connection for the rear door 17 of the front unit 11 is shown in detail in FIG. 4 and is diagrammatically illustrated in FIGS. 5 and 7.

Referring particularly to FIGS. 8 and 9, one of the side walls of unit 11 is provided with wire 20 having a loop 18 at one end thereof for attachment to the hook 19 (FIG. 8) of the front door 16 and is also provided with a loop or ring 30 at the other end of the wire. Other wires 20 are provided with similar loops or rings 30 through which the pin 31 (FIGS. 4 and 10) may be removably inserted to provide the hinge for the door 17. A pin 31 (FIG. 10) may also be inserted through loops 18 in front of the hooks 19 when the door 16 is closed to latch the door closed. Suitable fastening means such as shown in FIGS. 4 and 8 for the door 16 may be provided for other swinging doors with which the units 11, 12, and 13 may be supplied. As best seen in FIG. 4, the unit 13 is provided with a plurality of loops 35 projecting inwardly from the front end frame 24 on each side of the frame. A plurality of loops 35 are vertically spaced along the upright members on each side of the end frame 24. Loops 36 formed on opposite ends of the horizontal wires of the removable door 16' of unit 13 are spaced to bear against the loops 35 on the front end frame 24 in the manner of a pin and pintle hinge when a hinge pin 31 is inserted through the aligned loops 35 and 36. The loops 35 project inwardly so as not to interfer with the telescoping of the units 11, 12 and 13 and similarly the loops 30 project outwardly from the rear end frame of unit 11 for the same reason.

The rear end of unit 13 may be provided with a door 17' as previously described, but it may also be permanently closed by wire mesh welded to the end frame 24a.

The invention has been described in detail for the purpose of illustration but it will be obvious that numerous modifications and variations may be resorted to without departing from the spirit of the invention in its broadest aspects as set forth in the accompanying claims.

What is claimed is:

1. A portable combined animal carrying cage and exercising pen comprising a plurality of telescopic units composed of open work material to provide ventilation at all times, said units including a main or housing unit provided with front closure means and additional units of progressively less cross sectional area and which may be telescoped within the housing unit to provide a carrying cage or may be expanded longitudinally in one direction to provide an exercising pen, the smallest additional unit having and end wall, and coacting means carried by adjacent units to prevent separation of the units in the extended positions, said units being separable from each other by longitudinal movement in the opposite direction from the extended position, each unit including a front end frame and a rear end frame, the front end frame being larger in area than the rear end frame of the same unit and of similar shape to said rear end frame, wire construction covering the walls of each unit and being secured to the inside of the front end frame and to the outside of the rear end frame, the rear end frame of each unit being slightly larger than the front end frame of the next smaller unit and overlapping the front end frame of said next smaller unit so that the two end frames interengage to prevent separation of the units in said one direction of expanding said units, the front end frame of each unit being larger than the maximum cross section of the next smaller unit, so that the next smaller unit and all sequentially smaller units will pass through the front end frame in the direction opposite to said one direction of expanding said units.

2. A device as set forth in claim 1 wherein the coacting means for preventing separation of the adjacent units comprises the end frames carried by said adjacent units.

3. A device as set forth in claim 1 wherein at least one of the units is provided with a swinging door of open mesh wire construction similar to the side, top and bottom walls, and hingedly connected to the adjacent end frame.

4. A device as set forth in claim 3 wherein securing means are provided for retaining the door in closed position.

5. A device as set forth in claim 3 wherein the door is readily removable and is provided with a removable hinge pin insertable in loops carried by an adjacent wall portion of the unit to which the door is attached.

6. A device as set forth in claim 1 wherein at least one of the telescopic units is provided with swinging closure means at at least one end thereof, and releasable securing means for said closure means.

7. A device as set forth in claim 6 wherein the releasable securing means comprises a hook and loop connection, carried respectively by the swinging closure means and the adjacent end of the unit to which the closure means is attached.

8. A portable combined animal carrying cage and exercising pen comprising a plurality of telescopic units composed of open work material to provide ventilation at all times, said units including a main or housing unit provided with front closure means and additional units of progressively less cross sectional area and which may be telescoped within the housing unit to provide a carrying cage or may be expanded longitudinally in one direction to provide an exercising pen, the smallest additional unit having and end wall, and coacting means carried by adjacent units to prevent separation of the units in the extended positions, said units being separable from each other by longitudinal movement in the opposite direction from the extended position, wherein each of the units is of rectangular cross section, each unit comprising rectangular end frames formed of rods of circular cross section, and side, top and bottom walls of open mesh wire construction formed of sets of wires crossing each other at right angles, one set of wires being secured to the end frames as by welding, wherein the end frames of each unit include a front end frame and a rear end frame, the front end frame being larger in area than the rear end frame of the same unit and of similar shape as said rear end frame, the wire construction covering the side, top and bottom walls of each unit being secured to the inside of the front end frame and to the outside of the rear end frame, the rear end frame of each unit being slightly larger than the front end frame of the next smaller unit and overlapping the front end frame of said next smaller unit so that the two end frames interengage to prevent separation of the units in said one direction of expanding said units, the front end frame of each unit being larger than the maximum cross section of the next smaller unit, so that the next smaller unit and all sequentially smaller units will pass through the front end frame in the direction opposite to said one direction of expanding said units.

9. A device as set forth in claim 8 wherein the device comprises two telescopic units in addition to said housing unit, the unit next smaller to said housing unit being an intermediate unit, said intermediate unit having flat slide bearing means mounted longitudinally outside of the open work material of at least the sides and bottom of said intermediate unit for providing smooth sliding motion of said intermediate unit relative to said housing unit.

* * * * *

UNITED STATES PATENT OFFICE
CERTIFICATE OF CORRECTION

Patent No. 4,140,080　　　　　　　　Dated　　　February 20, 1979

Inventor(s)　HOWARD T. SANDER

It is certified that error appears in the above-identified patent and that said Letters Patent are hereby corrected as shown below:

Patent No. 4,140,080 should be corrected to show correct spelling of the inventor's name:

HOWARD T. SANDER

Signed and Sealed this

Fifth Day of June 1979

[SEAL]

Attest:

RUTH C. MASON
Attesting Officer

DONALD W. BANNER
Commissioner of Patents and Trademarks